Patented Dec. 13, 1938

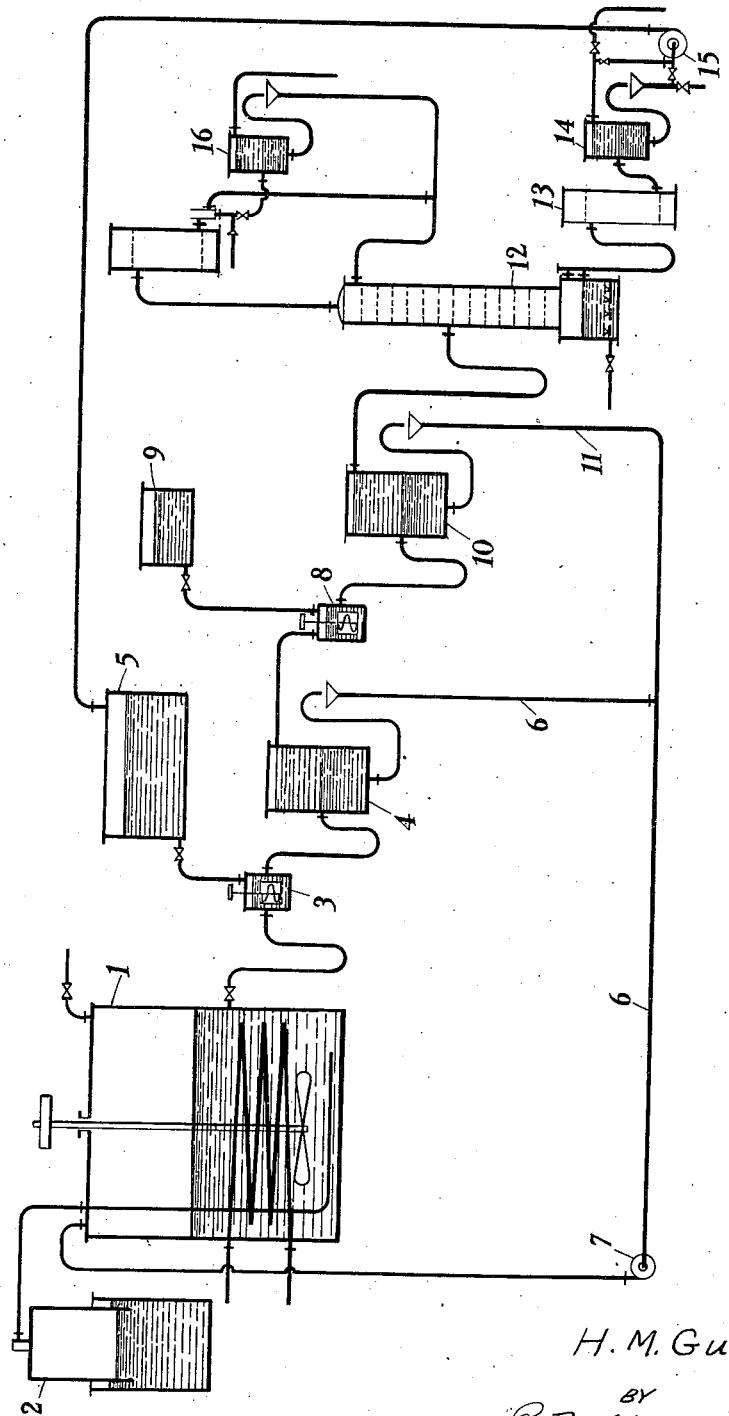

2,139,953

UNITED STATES PATENT OFFICE 2,139,953

HYDRATION OF OLEFINES

Henri Martin Guinot, Niort, Deux-Sevres, France, assignor to Usines de Melle, Melle, France, a corporation of France Application February 26, 1936, Serial No. 65,916
In France March 22, 1935

7 Claims. (Cl. 260—641)

This invention relates to the hydration of olefines.

It is well known to cause olefines to act on sulphuric acid with the object of being converted into corresponding alcohols.

It has also been proposed to extract the alcohols formed in this process by means of organic solvents such as hydrocarbons, water-insoluble aliphatic ethers or halogenated hydrocarbons.

The object of the present invention is to render this process of alcohol production easier and less expensive and to improve the yields of alcohol by employing as the organic solvent a solvent selected from the group consisting of the phenols, the cresols, their homologues, their ethers and their phosphates.

In a preferred way of carrying out the present invention the concentration of the acid reaction solution is maintained by feeding back to it quantities of water equal to the amount of water absorbed in the hydration of the olefines, after this water has been used for washing the acid from the solvent extraction mixture. It will be appreciated that the optimum acid concentration will vary according to the nature of the olefines treated.

Therefore the process according to the present invention consists essentially in dissolving the olefine in an aqueous solution of sulphuric acid sufficiently dilute to ensure that the alcohol exists therein in the free state, and in extracting the alcohol formed by means of a solvent which is unacted upon by the acid solution, this acid solution being re-used indefinitely for dissolving fresh quantities of olefines.

However, if it is necessary that the sulphuric acid solution to be used for dissolving the olefine should contain a fairly large quantity of water, no general rule can be given concerning the strength of the sulphuric acid to be used; this concentration depends, above all, on the nature of the olefine treated; to a smaller degree, it depends on other factors, such as the temperature, the pressure, and the catalysts employed to carry out the operation.

Be that as it may, it is always advantageous to take an acid solution containing as much water as possible, regard being had to the fact that one is restricted in this course by the very rapid diminution in the solubility of the olefine in a sulphuric acid solution of decreasing concentration. What is most important is that the sulphuric acid solution employed should not produce polymers, or sulphurous acid or derivatives of any kind.

The extraction of the alcohol may be carried out in a discontinuous manner, but is preferably carried out continuously even in the course of the operation of solution of the olefine. The selected solvent is emulsified with the hydrating sulphuric liquid and the mixture is then passed into a decanter where the solvent, which is charged with alcohol, and the aqueous sulphuric solution, which is returned to the mother solution, are separated.

It is observed that the layer of solvent is always slightly charged with sulphuric acid; it is treated with a small quantity of pure water which removes this acid (and a small quantity of alcohol) from it, and the new dilute sulphuric solution thus obtained is returned to the reaction vessel. As stated above, the quantity of water that is used for effecting this washing should be just that which corresponds to the quantity of water that is necessary for the purpose of obtaining the hydration of the olefine treated.

The layer of solvent that has thus been deacidified is then freed, by simple steam distillation, from the alcohol with which it is charged. The alcohol produces with the water an azeotropic mixture which always boils at a definitely lower temperature than the azeotropic mixture formed by the water and the solvent employed. Consequently, this distillation does not involve any difficulty, especially on account of the fact that the alcohol is formed in advance in the solvent.

The recovered solvent of the present process is, after being cooled, used again for a fresh extraction, and so on indefinitely.

All these operations may be conducted at a pressure which is different from the atmospheric pressure. Generally speaking, a raised pressure is favorable, because it enables a sufficient speed of solution of the olefine to be obtained even with sulphuric acid solutions that are rich in water; this leads, as has been seen, to purer reactions without the formation of undesirable products.

A favorable action is likewise exerted by a moderately raised temperature as well as by the employment of the catalysts usually mentioned for this type of reaction, such as the oxides of copper, of silver, of lead, of bismuth, of gold, etc.

The invention is applicable, not only to a pure olefine but to an olefine mixed with inert gases, such as saturated hydrocarbons, hydrogen and nitrogen, and to mixtures of olefines alone or mixed with the aforesaid inert gases.

The following examples described with reference to the accompanying drawing will enable the manner of carrying the invention into practice to be well understood:

EXAMPLE 1

Manufacture of secondary butyl alcohol

In a vessel 1, having a useful capacity of 1000 litres and provided with a cooling system, there are placed 620 litres of an aqueous solution of sulphuric acid titrating to 72 per cent. of acid, to which solution there may be added a catalyst consisting, for example, of cuprous oxide to the extent of 0.5 per cent. The butylene is taken from a gasometer 2 placed under atmospheric pressure. The solution in vessel 1 is agitated by some mechanical means which is capable of ensuring a good emulsification of the butylene gas in the hydrating liquid.

When the reaction is proceeding normally, the temperature is allowed to rise to the vicinity of 50° C. It is observed that the velocity of absorption is about 50 cubic metres of butylene per hour; except for the starting period, a determination in iced water of the total acidity shows 99 per cent. of the initial acidity to be existing in the free state.

When the content of free alcohol in the hydrating bath is of the order of 20 to 25 per cent. a certain volume of this acid liquid is taken and passed into a mixer 3 which is also fed by double the volume of solvent coming from a tank 5, this solvent being, for example, tricresyl phosphate.

The emulsified mixture of the two liquids is passed into a decanter 4 where it separates into two layers, the upper layer consisting of the tricresyl phosphate containing in solution about 75 gms. per litre of secondary butyl alcohol together with a small quantity of water and sulphuric acid, and the lower layer consisting of the mother sulphuric solution still containing a certain proportion of unextracted butyl alcohol, in the present case about 100 gms. per litre. As the volume of the upper layer is nearly double that of the lower layer, 150 gms. of alcohol per litre of sulphuric solution treated are thus extracted from the available 250 gms.

It is useless to endeavor to obtain a total extraction of the alcohol by the solvent. It is possible to do so by using a battery formed of a sufficient number of elements, but this, as a general rule, constitutes a complication without a great advantage. It is simpler to increase the rate of circulation of the sulphuric liquid between the reaction tank 1 and the extraction system.

The acid solution thus separated in the decanter 4 is returned by the pipe 6 and the pump 7 into the reaction vessel 1. As to the slightly acid solvent, it is passed into a mixer 8 at the same time as a small quantity of water coming from a tank 9. This quantity of water corresponds to the amount necessary—i. e., 36 litres per hour—for the hydration of the 50 cubic metres of butylene absorbed. Here, it might be of advantage for the work of de-acidification to be effected in a washing battery formed of several elements. For the sake of simplicity, only one element has been shown in the drawing.

After agitation in the vessel 8, the mixture of the two liquids is passed on for decantation in a second decanter 10; the aqueous bottom layer returns to the reaction vessel 1 by passing through the pipe 11, the pipe 6 and the pump 7. As for the de-acidified layer of solvent, it is passed into a distillation column 12 of any suitable type, which is heated by bubbling steam into its contents. The water forms with the secondary butyl alcohol a mixture of fixed composition boiling at 87.5° C.; this mixture collects at the top of the column 12 whilst the excess of water and of tricresyl phosphate reunite with each other in the bottom part.

After being cooled in vessel 13, the mixture of water and tricresyl phosphate passes into a decanter 14; the aqueous top layer is thrown away and the recovered tricresyl phosphate is returned into the solvent tank by means of the pump 15.

The hydrated butyl alcohol obtained contains from 28 to 30 per cent. of water. It is dehydrated by known means and the pure anhydrous alcohol boiling at 99.5° C. is separated.

EXAMPLE 2

Manufacture of isopropyl alcohol

The olefine treated is propylene. The work is carried out in an apparatus that is identical with that of Example 1. The acid employed is sulphuric acid of a strength of 75 per cent. strength and containing 0.5 per cent. of cuprous oxide. The solution of the propylene is effected in the reaction vessel 1, using a pressure of three atmospheres. The velocity of absorption of the propylene in the hydrating liquid in the vessel 1 is 20 cubic metres per hour reckoned at atmospheric pressure.

The extraction of the isopropyl alcohol is effected by washing the acid liquid with three times its volume of butyl-cresol. When the bottom layer flowing from the decanter 4 still contains 100 gms. of alcohol, it is observed that the top layer of solvent contains 50 gms. of alcohol. This, as in Example 1, renders necessary a slightly greater velocity of circulation of the hydrating liquid between the vessel 1 and the extraction system; in any case, 150 gms. of isopropyl alcohol are extracted for every litre of acid liquid treated in the mixer 3 and the decanter 4.

In the same way as in Example 1, the reaction liquid remains at the same concentration indefinitely, owing to the continuous addition of water coming from the tank 9 and used for the de-acidification of the butyl-cresol.

The butyl-cresol flowing away at the base of the column 12, mixed with an excess of water, is cooled in vessel 13 and then decanted in decanter 14. This time, the layer to be thrown away is the bottom layer. The top layer is returned to the solvent tank by the pump 15.

As for the isopropyl alcohol, it is obtained in the form of a binary azeotropic mixture at the top of the column 12; this mixture boils at 80.3° C. and consists of alcohol to the extent of 88 per cent. and of water as to the remaining 12 per cent. It does not decant. It is dehydrated, if necessary, by known methods.

EXAMPLE 3

Manufacture of tertiary butyl alcohol

The olefine treated is isobutylene. The apparatus is identical with that of Example 1. The sulphuric acid used has a concentration of 58 per cent. and does not contain any catalyst. The reaction temperature is kept at about 50° C. The work is carried out at atmospheric pressure.

The sulphuric solution, containing 250 gms. of the free alcohol per litre, is treated with one and a half times its volume of tricresol (an industrial product consisting of the three isomeric cresols). After extraction, the solvent contains, just as the sulphuric acid, 100 gms. per litre of the alcohol.

The tertiary butyl alcohol is separated in the form of an azeotropic mixture boiling at 79.9° C. and containing alcohol to the extent of 88.3 per cent. and of water to the extent of 11.7 per cent. After dehydration, there is obtained the pure anhydrous alcohol which melts at 25° C. and boils at 82.5° C.

EXAMPLE 4

*Manufacture of amyl alcohol*

The olefine treated is trimethylethylene.

In this case, it is advantageous to send the olefine into the reaction vessel 1 in the liquid state. The hydrating solution consists of sulphuric acid of 50 per cent. strength without any catalyst. The work is carried out under atmospheric pressure. The extracting agent is ethylphenol which is obtained by the action of ethyl alcohol on phenol in the presence of zinc chloride and consists of a mixture of isomers that is rich in the para derivative.

The solvent and the hydrating acid liquid are employed in equal volumes, the latter containing 20 per cent. of the alcohol in the free state.

The amyl alcohol is obtained at the top of the column 12 in the form of a minimum boiling-point mixture which boils at 87° C. and contains about 30 per cent. of water. This mixture is heterogeneous; it is passed into the decanter 16 the amyl alcohol is obtained as the top layer; it is dehydrated by known means and separated in the pure state; its boiling point is 102° C. The aqueous bottom layer is continually brought back to the top of the distillation column 12 by a method of working which has now become classic.

These examples are not limitative and must not be regarded as restricting the scope of the invention.

What I claim is:

1. In a process for producing aliphatic alcohols by simultaneous absorption and hydration of the corresponding olefines in an acid absorption agent, the step of separating the alcohol from said absorption agent by extraction with an organic solvent selected from a group consisting of phenols, cresols, their homologues, their ethers and their phosphates.

2. In a process of producing aliphatic alcohols by the simultaneous absorption and hydration of the corresponding olefines in an acid absorption agent, the steps of separating the alcohol from said absorption agent by extraction with an organic solvent selected from a group consisting of phenols, cresols, their homologues, their ethers and their phosphates, removing acid from said solvent by washing with water and returning said washing water to the vessel containing said absorption agent.

3. In a process of producing aliphatic alcohols by the simultaneous absorption and hydration of the corresponding olefines in an acid absorption agent, the steps of separating the alcohol from said absorption agent by extraction with an organic solvent selected from a group consisting of phenols, cresols, their homologues, their ethers and their phosphates, removing acid from said solvent by washing with water and returning the said washing water to the vessel containing said absorption agent, the quantity of water being used for this washing corresponding exactly to the water absorbed by the hydration of the olefine.

4. In a process of producing aliphatic alcohols by simultaneous absorption and hydration of the corresponding olefines in an acid absorption agent, the steps of separating the alcohol from said absorption agent by extraction with an organic solvent selected from a group consisting of phenols, cresols, their homologues, their ethers and their phosphates, and separating the alcohol and the solvent from each other by azeotropic distillation with steam.

5. A process of producing aliphatic alcohols which comprises absorbing the corresponding olefines in an aqueous solution of an acid absorption agent, extracting the alcohols formed with an organic solvent selected from the group consisting of phenols, cresols, their homologues, their ethers and their phosphates, removing acid from said solvent and separating the alcohol from said solvent by azeotropic distillation by means of steam.

6. A process of producing aliphatic alcohols which comprises absorbing corresponding olefines in an aqueous solution of an acid absorption agent, extracting the alcohols formed with an organic solvent selected from the group consisting of phenols, cresols, their homologues, their ethers and their phosphates, removing acid from said solvent by washing with an amount of water equal to the amount of water absorbed in the hydration of said olefines, separating said washing water from the solution of the said solvent and alcohol, returning said washing water to the vessel containing said absorption agent and separating said alcohol from the solvent by azeotropic distillation with steam.

7. A process for the continuous production of aliphatic alcohols which comprises the simultaneous absorption and hydration of the corresponding olefines in an aqueous solution of an acid absorption agent in a main reaction vessel, continuously withdrawing liquid containing alcohols from said reaction vessel, agitating said liquid with an organic solvent selected from the group consisting of phenols, cresols, their homologues, their ethers and their phosphates, allowing said agitated mixture to settle, returning the acid aqueous solution produced by said settling back to said main reaction chamber, transferring the solution of acidified solvent and alcohol to an agitator, agitating said solution with a quantity of water equal to the amount of water absorbed by the hydration of the olefine in said main reaction vessel, allowing said agitated solution to settle, returning to the main reaction vessel the solution of acid in the added water, transferring the de-acidified solvent and alcohol to a still, and separating alcohol from said solvent by azeotropic distillation by means of steam.

HENRI MARTIN GUINOT.